(12) United States Patent
Jain et al.

(10) Patent No.: US 11,502,959 B2
(45) Date of Patent: Nov. 15, 2022

(54) TRAFFIC FLOW BASED MAP-CACHE REFRESH TO SUPPORT DEVICES AND THEIR DYNAMIC POLICY UPDATES

(71) Applicant: Cisco Technology, Inc., San Jose, CA (US)

(72) Inventors: Prakash C. Jain, Fremont, CA (US); Sanjay Kumar Hooda, Pleasant, CA (US); Karthik Kumar Thatikonda, Dublin, CA (US); Denis Neogi, Kanata (CA); Rajeev Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 16/950,315

(22) Filed: Nov. 17, 2020

(65) Prior Publication Data
US 2022/0158943 A1   May 19, 2022

(51) Int. Cl.
| | |
|---|---|
| *H04L 47/20* | (2022.01) |
| *H04L 61/58* | (2022.01) |
| *H04L 67/63* | (2022.01) |
| *H04L 43/026* | (2022.01) |
| *H04L 45/74* | (2022.01) |
| *H04L 45/745* | (2022.01) |

(Continued)

(52) U.S. Cl.
CPC ............ *H04L 47/20* (2013.01); *H04L 43/026* (2013.01); *H04L 45/742* (2013.01); *H04L 45/745* (2013.01); *H04L 47/32* (2013.01); *H04L 61/103* (2013.01); *H04L 61/58* (2022.05); *H04L 67/63* (2022.05)

(58) Field of Classification Search
CPC ..... H04L 47/20; H04L 43/026; H04L 45/742; H04L 45/745; H04L 47/32; H04L 61/103; H04L 61/6009; H04L 67/327
See application file for complete search history.

(56) References Cited

U.S. PATENT DOCUMENTS

| | | | |
|---|---|---|---|
| 2014/0241353 A1* | 8/2014 | Zhang | .................... H04L 45/74 370/392 |
| 2018/0159813 A1 | 6/2018 | Xiaopu et al. | |

FOREIGN PATENT DOCUMENTS

| | | | | |
|---|---|---|---|---|
| CN | 102088390 A | * | 6/2011 | ....... H04L 29/12028 |
| CN | 105591935 A | * | 5/2016 | ............. H04L 45/02 |
| WO | WO-2011069383 A1 | * | 6/2011 | ....... H04L 29/12028 |

OTHER PUBLICATIONS

International Search Report and Written Opinion issued in International Application No. PCT/US2021/059230, dated Feb. 28, 2022, (17 pages).

(Continued)

*Primary Examiner* — Yaotang Wang
(74) *Attorney, Agent, or Firm* — Merchant & Gould P.C.

(57) ABSTRACT

A traffic flow based map cache refresh may be provided. A computing device may receive a dropped packet message when a packet associated with a flow having a destination and a source was dropped before it reached the destination. Next, in response to receiving the dropped packet message, a map request message may be sent to a Map Server (MS). In response to sending the map request message, a map response message may be received indicating an updated destination for the flow. A map cache may then be refreshed for the source of the flow based on the updated destination from the received map response message.

20 Claims, 4 Drawing Sheets

(51) Int. Cl.
    *H04L 47/32*       (2022.01)
    *H04L 61/103*     (2022.01)

(56) References Cited

OTHER PUBLICATIONS

Fuller, V. et al., Cisco Systems, "Locator/ID Separation Protocol (LISP) Control-Plane draft-ietf-lisp-rfc6833bis-17", Internet-Draft: Network Working Group, IETF (ISOC) 4, Geneva, S, No. 17 (Oct. 3, 2018) 56 pages.

* cited by examiner

US 11,502,959 B2

TRAFFIC FLOW BASED MAP-CACHE REFRESH TO SUPPORT DEVICES AND THEIR DYNAMIC POLICY UPDATES

TECHNICAL FIELD

The present disclosure relates generally to providing a traffic flow based map cache refresh.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
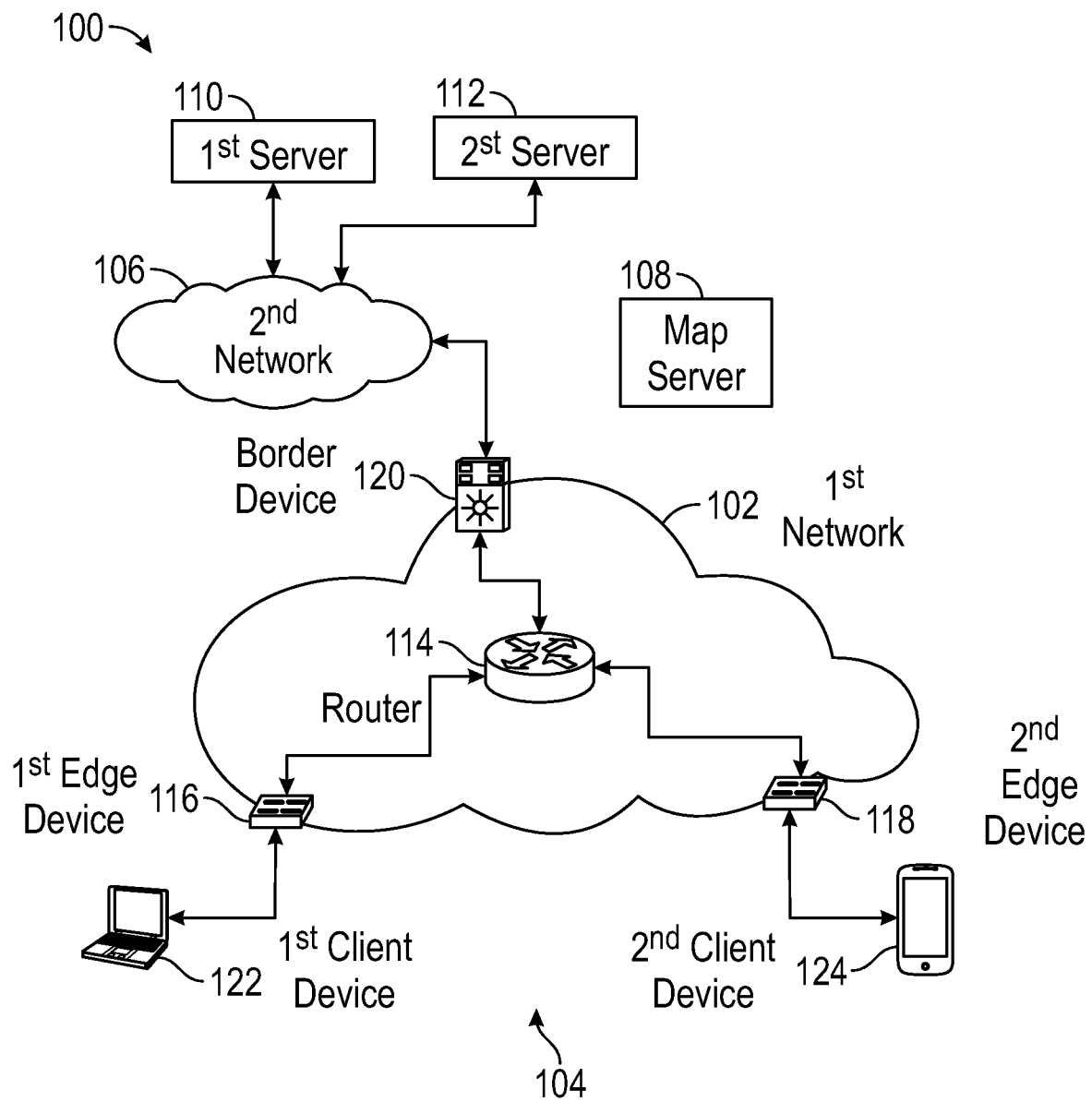
FIG. 1 is a block diagram of a network.

A traffic flow based map cache refresh may be provided. A computing device may receive a dropped packet message when a packet associated with a flow having a destination and a source was dropped before it reached the destination. Next, in response to receiving the dropped packet message, a map request message may be sent to a Map Server (MS). In response to sending the map request message, a map response message may be received indicating an updated destination for the flow. A map cache may then be refreshed for the source of the flow based on the updated destination from the received map response message.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks may comprise an overlay and an underlay. The underlay deals with connectivity between fabric network devices and the overlay deals with user traffic transiting the fabric network. The fabric network overlay may comprise functional components such as Fabric Edge Devices (EDs or FEs), fabric intermediate devices, Fabric Border Devices (FBs or BDs), a Map Server (MS), and a fabric Control Plane (CP).

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices or hosts) may be attached to the FE devices. The end points may be in Endpoint Identification space where each endpoint may have an Endpoint Identifier (EID). Each device in the fabric network (e.g., FE devices and FB devices) may be configured with an address (e.g., a locator address). FE devices may register discovered EIDs (from the end points) with a fabric host-tracking database running on the MS associating the discovered EID to, for example, the configured locator address of the FE device that discovered it.

When a local FE device receives a packet from a local end point destined to a remote end point (i.e., on a remote FE device) whose location is not known (e.g., end points connected over the internet), the local FE device may send a map request message to the MS. The MS may have a border device registered as a provider of internet service. In that case, the MS may reply to a map request with a remote locator address that is an address of the internet service border. Once the local FE device receives a the reply message back from the MS associating the unknown EID to the remote locator address, all subsequent traffic from the local end point may be encapsulated (e.g., LISP encapsulated) and forwarded to the remote locator address (i.e., remote xTR device). Once the encapsulated packet is received on the remote xTR device, the remote xTR device may decapsulate the packet and forward natively (e.g., to the remote endpoint).

When a local FE device receives a packet from a local end point destined to a remote end point (i.e., on a remote FE device) whose location is not known at the local FE, the local FE device may send a map request message to the MS. The MS may have a remote end point registered with the Routing Locator (RLOC) of another remote FE. In that case, the MS may reply to a map request with a remote locator address that is an address of the remote FE. Once the local FE device receives a the reply message back from the MS associating the remote EID to the remote locator address, subsequent traffic from the local end point may be encapsulated (e.g., LISP encapsulated) and forwarded to the remote locator address (i.e., remote xTR device). Once the encapsulated packet is received on the remote xTR device, the remote xTR device may decapsulate the packet and forward natively (e.g., to the remote endpoint).

FB devices may connect the fabric network to the native routing domain. FB devices may be configured, for example, as LISP PxTR nodes and may provide a default gateway service to the FE nodes. Communication may happen through the FB device configured, for example, as a LISP PxTR node. When an FE device receives a packet from a local end point destined to a host outside the fabric network in the native routing domain, the FE device may encapsulate and send the packet to the FB device. The FB device may provide, for example, the LISP PxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnet to any part of the fabric network. For example, a subnet may be present across multiple FE devices with the same anycast gateway Internet Protocol (IP) address to allow for roaming by allowing endpoints to continue using the same gateway IP address. The provided services may also include Layer-3 overlay service and built-in mobility.

Conventional map caches (e.g., conventional LISP map caches) may be destination based, consequently, when they are refreshed or removed, the traffic destined to those destinations may be impacted irrespective of the source. However, with fabric networks (e.g., using Software Defined Access (SDA)) that support, for example, different industrial IoT devices communicating to a cloud server with secured identity/group based policy access, there may be a need to dynamically update map caches specific for certain flows (i.e., flows between a specific source and destination subnets/groups). This may be useful when certain users/IoT devices (e.g., electronic badges, personal IoT devices, cloud based IoT devices, etc.) are given access or striped from access to certain privileged services provided by cloud servers for example. This may require existing map caches to be refreshed without waiting, for example, for a 24 hour aging timeout. It is also desirable to not impact other flows (e.g., the same destination, but different source) that might be using the same time critical services like campus security/ surveillance, emergency-response voice/video calls that should not be impacted (i.e., map-caches for those flows should not be removed and relearned, if dynamic/policy change is not impacting those flows).

Conventional map-cache mechanisms (e.g., Solicit Map Requests (SMR)/away table etc.) may be destination based. This may make it difficult to change access to common/ critical services in the enterprise fabric network for a set of users without impacting other users. The problem may become more difficult if the fabric network is used for mission critical applications (e.g., hospitals, defense, aviation, space explorations, autonomous driving etc.) using various sensors and IoT devices. Also, a conventional LISP data path SMR may be User Datagram Protocol (UDP) based and it may also derive its destination (i.e., where to send the SMR) from the source of data packets, which may negatively impact its reliability. If an SMR UDP packet is lost or the source of the data packet is wrong or unreachable directly, the SMR may not reach its correct destination xTR (e.g., network device) to refresh the map-cache. This may cause traffic to continue to leak or "black hole" due to dynamic changes or software/network errors.

Accordingly, embodiments of the disclosure may dynamically refresh map-caches for specific flows without impacting other flows for time critical applications as well as for serviceability and faster recovery from software or network issues. Some embodiments of the disclosure may install a "flow based" away entry in the Forwarding Information Base (FIB) and forwarding hardware to drop packets and generate an SMR for the "flows". Other embodiments may, if the number of packets hitting the away entry still keep increasing and the number of SMRs generated increases beyond a threshold (i.e., a predetermined value), send a "reliable SMR" from a receiver xTR (e.g., a FB) to a source xTR (e.g., a FE) via a map server using, for example, Transmission Control Protocol (TCP) sessions between the map server and the xTRs to refresh the map caches. Embodiments of the disclosure may ensure that dynamic policy changes may be reliably refreshed in the map-caches in the network without causing delay or scale issues.

FIG. 1 shows a system 100 consistent with embodiments of the disclosure for providing services with policy control. As shown in FIG. 1, system 100 may comprise a first network 102, a plurality of client devices 104, a second network 106, a map server 108, a first server 110, and a second server 112. First network 102 may comprise a plurality of network devices including, but not limited to, a router 114, a first edge device 116, a second edge device 118, intermediate network devices (not shown), and a border device 120. Plurality of client devices 104 may comprise a first client device 122 and a second client device 124. Second network 106 may comprise a network outside of first network 102, for example, a network to the cloud (e.g., the Internet). Server 110 and server 112 may each respectively provide any service (e.g., cloud based) comprising, but not limited to, Dynamic Host Configuration Protocol (DHCP), Domain Name System (DNS), Authentication, Authorization and Accounting (AAA), and other shared services. Map server 108 may comprise, but is not limited to, a LISP map server.

The plurality of network devices in first network 102 may comprise, but are not limited to, switches and routers for example. First network 102 may comprise any number of network devices. Plurality of client devices 104 may comprise any number of client devices and is not limited to two. Each of plurality of client devices 104 may comprise any type device wishing to communicate over first network 102. For example, each of plurality of client devices 104 may comprise, but are not limited to, a Wi-Fi access point, a cellular base station, a tablet device, an Internet-of-Things (IoT) device, a mobile device, a smart phone, a telephone, a remote control device, a set-top box, a digital video recorder, a cable modem, a personal computer, a notebook computer, a network computer, a mainframe, a router, or other similar microcomputer-based device.

First network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., first network 102) through FE devices (e.g., first edge device 116 and second edge device 118). The traffic may be routed through first network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing Layer-2 and Layer-3 services on top of the underlay. The fabric network may have endpoints (e.g., plurality of client devices 104) connected to it.

First client device 122 and second client device 124 may respectively connect to first edge device 116 and second edge device 118 wirelessly through a wireless system comprising, but not limited to, WiFi, 4G, or 5G. First client device 122 and second client device 124 may comprise, but are not limited to, IoT devices that may obtain services from first server 110 or second server 112.

The elements described above of system 100 (e.g., map server 108, server 110, server 112, router 114, first edge device 116, second edge device 118, border device 120, first client device 122, or second client device 124) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of system 100 may be practiced in a computing device 400.

Figure 2:
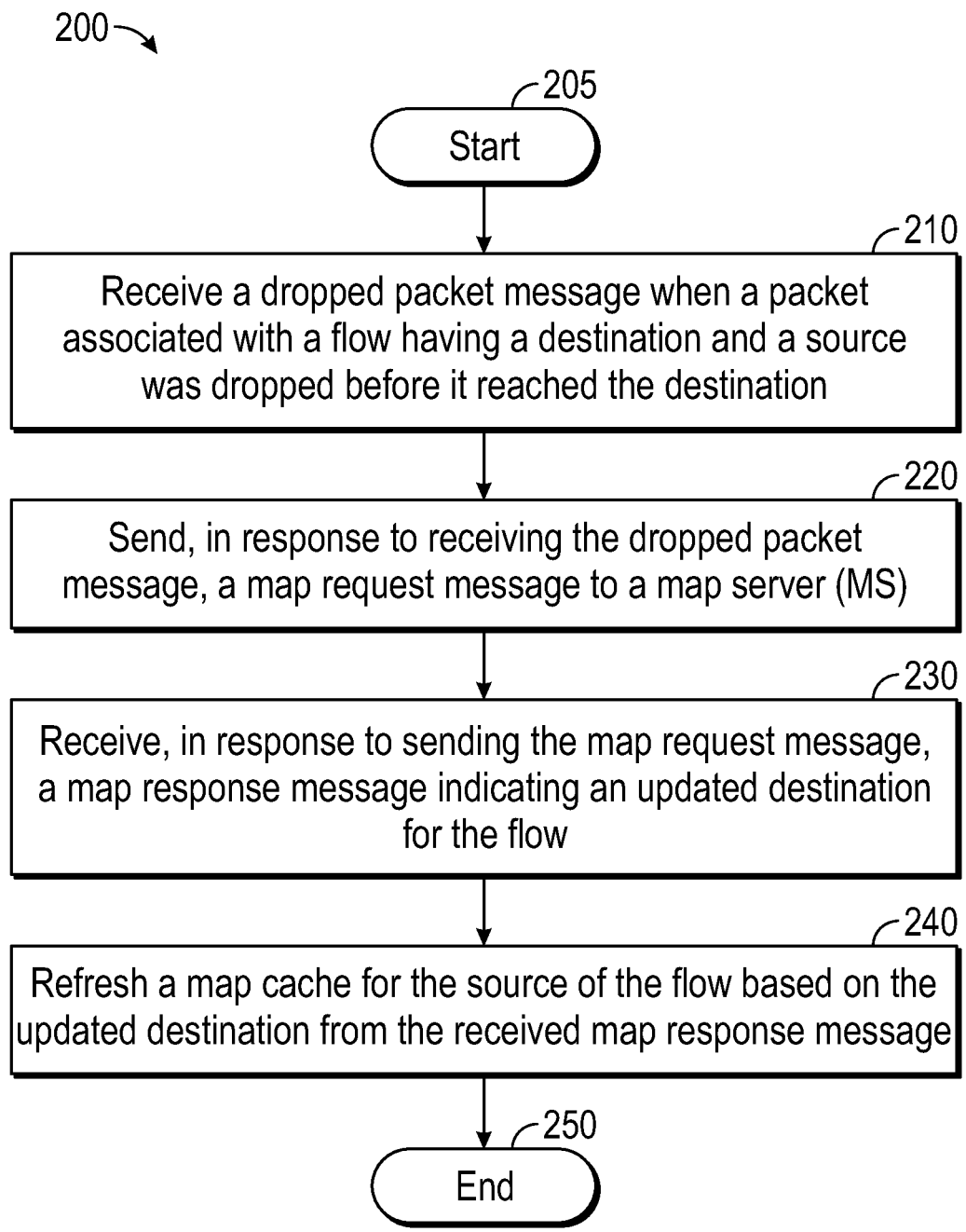
FIG. 2 is a flow chart of a method for providing traffic flow based map cache refresh.

FIG. 2 is a flow chart setting forth the general stages involved in a method 200 consistent with an embodiment of the invention for providing a traffic flow based map-cache refresh. Method 200 may be implemented using first edge device 116 as described in more detail above with respect to FIG. 1. Embodiments illustrated in FIG. 2, for example, may install a "flow based" away entry in the FIB and forwarding hardware to drop packets and generate an SMR for the "flows". Ways to implement the stages of method 200 will be described in greater detail below.

Method 200 may begin at starting block 205 and proceed to stage 210 where first edge device 116 may receive a dropped packet message when a packet associated with a flow having a destination and a source was dropped before it reached the destination. For example, when a dynamic policy is changed related to a destination and source prefix pair (e.g., related to certain host/IoT devices and cloud servers in same or different Virtual Routing and Forwarding (VRF)/instances), an away table entry may be installed in Express Forwarding/FIB and forwarding hardware (e.g., in border device 120) to drop the packets specific to that source and destination prefix pair. In other words, a dynamic policy may be changed to deny first client device 122 access to first server 110. In response, an away table entry may be installed on border device 120 that may cause border device 120 to drop packets in a flow that have first server 110 as a destination and first client device 122 as a source. Notwithstanding the away table entry may cover a plurality of sources and not just one source. Whenever any data packet hits this away table entry in border device 120, that data packet related to that "flow" may be dropped by border device 120 and not sent to the destination (e.g., first server 110). In addition, border device 120 may generate a dropped packet message and send it to first edge device 116. The dropped packet message may comprise, but is not limited to, a User Datagram Protocol (UDP) Solicit Map Requests (SMR) generated towards the source RLOC address of that data packet (e.g., the RLOC address of first edge device 116).

From stage 210, where first edge device 116 received the dropped packet message when the packet associated with the flow having the destination and the source was dropped before it reached the destination, method 200 may advance to stage 220 where first edge device 116 may send, in response to receiving the dropped packet message, a map request message to map server 108. For example, when the dropped packet message (e.g., SMR) reaches to the source xTR (e.g., first edge device 116), the source xTR (e.g., first edge device 116) may map request map server 108 for the new mapping (i.e., updated destination mapping) of the destination Endpoint Identifier (EID).

Once first edge device 116 sends, in response to receiving the dropped packet message, the map request message to map server 108 in stage 220, method 200 may continue to stage 230 where first edge device 116 may receive, in response to sending the map request message, a map response message indicating an updated destination for the flow. For example, during the aforementioned dynamic policy change, for the source comprising first client device 122, the destination EID may have been updated from the EID of first server 110 to the EID of second server 112 on map server 108. Accordingly, the updated destination for the flow in the map response message may comprise the EID of second server 112 instead of the EID of first server 110. Consequently, map server 108 map replies with mapping as per the new policy change.

After first edge device 116 receives, in response to sending the map request message, the map response message indicating the updated destination for the flow in stage 230, method 200 may proceed to stage 240 where first edge device 116 may refresh a map cache for the source of the flow based on the updated destination from the received map response message. For example, using the refreshed map cache, first edge device 116 may now include the correct destination (e.g., second server 112) on packets sent from first client device 122. When these new packets arrive at border device 120, the away table entry may not cause them to be dropped anymore because they no longer have the source and destination prefix pair for first client device 122 and first server 110, but now have the source and destination prefix pair for first client device 122 and second server 112. Once first edge device 116 refreshes the map cache for the source of the flow based on the updated destination from the received map response message in stage 240, method 200 may then end at stage 250.

Figure 3:
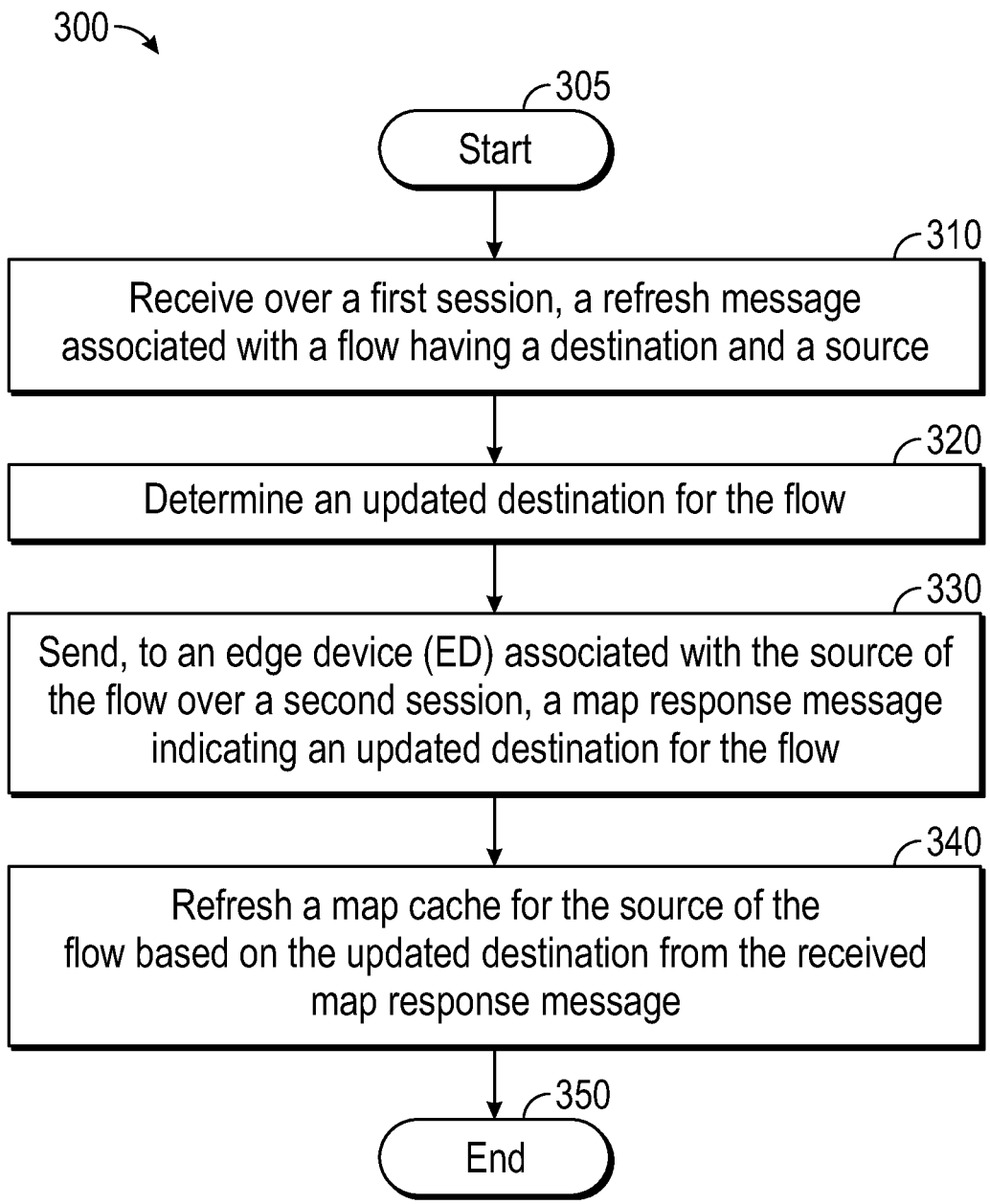
FIG. 3 is a flow diagram of a method for providing traffic flow based map cache refresh.

FIG. 3 is a flow chart setting forth the general stages involved in a method 300 consistent with an embodiment of the disclosure for providing a traffic flow based map cache refresh. Method 300 may be implemented using map server 108 as described in more detail above with respect to FIG. 1. Embodiments illustrated by FIG. 3 may, if the number of packets hitting the away entry still keep increasing and the number of SMR generated increases beyond a threshold (i.e., a predetermined value), send a "reliable SMR" from a receiver xTR (e.g., border device 120) to a source xTR (e.g., first edge device 116) via map server 108 using, for example, Transmission Control Protocol (TCP) sessions between map server 108 and the xTRs to refresh the map cache in first edge device 116 for example. Ways to implement the stages of method 300 will be described in greater detail below.

Method 300 may begin at starting block 305 and proceed to stage 310 where map server 108 may receive over a first session, a refresh message associated with a flow having a destination and a source. For example, with the flow based away table entry installed as described above with respect to FIG. 2, if the receiver xTR (e.g., border device 120) of the disallowed packets continues to receive the traffic (flow away entry hits) after generating a predetermined number of dropped packet messages (e.g., SMRs beyond a preset threshold), the receiver xTR (e.g., border device 120) may conclude that either the dropped packet messages (e.g., SMRs) are not getting delivered to the source xTR (e.g., first edge device 116) of the data traffic or the source RLOC address (e.g., of first edge device 116) in the packet, for which it is sending the dropped packet messages, is incorrect or unreachable.

In other words, the away table entry on the receiver xTR (e.g., border device 120) keeps hitting because it may keep receiving packets with a source and destination prefix pair for first client device 122 and first server 110 respectively. With each hit, the receiver xTR (e.g., border device 120) may send a dropped packet messages (e.g., SMRs) to first edge device 116. After sending a predetermined number of dropped packet messages, border device 120 may assume that the dropped packet messages (e.g., SMRs) are not getting to first edge device 116. A software or network error may cause an incorrect source RLOC address to be present in the dropped data packet causing, for example, a UDP SMR to fail. Accordingly, after a predetermined number of dropped packet messages being sent, border device 120 may send map server 108 the refresh message associated with the flow having the destination and the source over a first session. The first session may comprise a first secured Transmission Control Protocol (TCP) session. The refresh message may comprise a "reliable SMR" sent over the TCP session. In this example, the receiver xTR (e.g., border device 120) may generate the "reliable SMR" with the same parameters and contents as in the UDP SMRs that were sent to the source xTR (e.g., first edge device 116). However, the "reliable SMR" may be sent to map server 108 over the reliable TCP session between the receiver xTR (e.g., border device 120) and map server 108.

From stage 310, where map server 108 receives over the first session, the refresh message associated with the flow having the destination and the source, method 300 may advance to stage 320 where map server 108 may determine an updated destination for the flow. For example, during the aforementioned dynamic policy change, for the source comprising first client device 122, the destination EID may have been updated from the EID of first server 110 to the EID of second server 112 on map server 108. Accordingly, the updated destination for the flow in the map response message may comprise the EID of second server 112 instead of the EID of first server 110. Consequently, map server 108 map replies with mapping as per the new policy change.

Once map server 108 determines the updated destination for the flow in stage 320, method 300 may continue to stage 330 where map server 108 may send, to an Edge Device (ED) (e.g., first edge device 116) associated with the source of the flow over a second session, a map response message indicating an updated destination for the flow. The second session may comprise a second secured TCP session. For example, map server 108 may notify to the source xTR (e.g., first edge device 116) over another reliable TCP sessions between map server 108 and the source xTR (e.g., first edge device 116) that has registered the source EID coming in the SMR. Map server 108 may find the source xTR (e.g., first edge device 116) from the registrations of source EID in the SMR (and not from source RLOC of the data packet). This may help in serviceability and assurance even when any software or network error causes an incorrect source RLOC address to be present in the data packet (causing UDP SMR to fail in refreshing the map cache).

After map server 108 sends, to the ED (e.g., first edge device 116) associated with the source of the flow over the second session, the map response message indicating the updated destination for the flow in stage 330, method 300 may proceed to stage 340 where the ED (e.g., first edge device 116) may refresh a map cache for the source of the flow based on the updated destination from the received map response message. For example, using the refreshed map cache, first edge device 116 may now include the correct destination (e.g., second server 112) on packets sent from first client device 122. When these new packets arrive at border device 120, the away table entry may not cause them to be dropped anymore because they no longer have the source and destination prefix pair for first client device 122 and first server 110, but now have the source and destination prefix pair for first client device 122 and second server 112. Once the ED (e.g., first edge device 116) refreshes the map cache for the source of the flow based on the updated destination from the received map response message in stage 340, method 300 may then end at stage 350.

Accordingly, embodiments of the disclosure may allow SDA fabric networks to update policy dynamically for IoT devices and other hosts that may need immediate (i.e., without waiting for a 24 hours timeout) map caches refresh. This may work based on "source/destination" (source/destination prefixes and VRF/IIDs) without impacting the "source/destination" to the same destination, but different source end points. Embodiments of the disclosure may work in the presence of network congestion or software and network errors (e.g., that may cause incorrect or unreachable source address of data packets) where existing data plane UDP SMR fails to update map caches.

Figure 4:
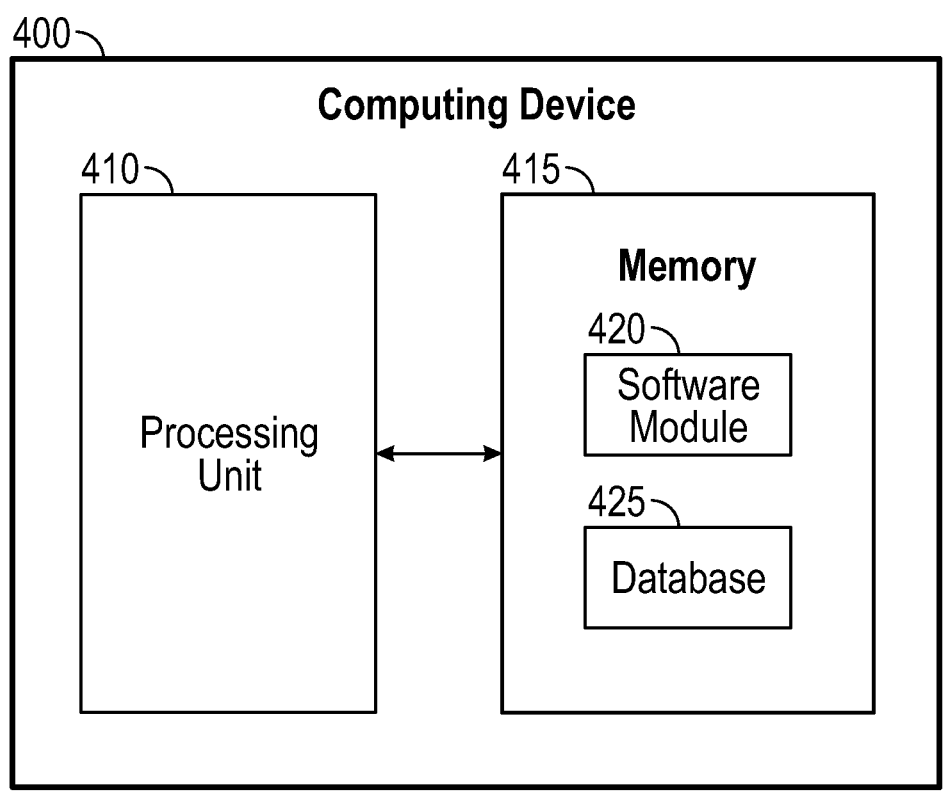
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing a traffic flow based map-cache refresh as described above with respect to FIG. 2 and FIG. 3. Computing device 400, for example, may provide an operating environment for map server 108, server 110, server 112, router 114, first edge device 116, second edge device 118, border device 120, first client device 122, or second client device 124. Map server 108, server 110, server 112, router 114, first edge device 116, second edge device 118, border device 120, first client device 122, or second client device 124 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
   receiving, by a device, a dropped packet message when a packet associated with a flow having a destination and a source was dropped before it reached the destination, wherein receiving the dropped packet message when the packet associated with the flow having the destination and the source was dropped before it reached the destination comprises receiving the dropped packet message in response to installation of an away table entry in a border device associated with the destination to drop packets specific to a destination and source prefix pair, and wherein the away table entry is installed upon change of a policy related to the destination and source prefix pair denying the source access to the destination;
   sending, in response to receiving the dropped packet message, a map request message to a Map Server (MS);
   receiving, in response to sending the map request message, a map response message indicating an updated destination for the flow; and
   refreshing a map cache for the source of the flow based on the updated destination from the received map response message.

2. The method of claim 1, further comprising changing the policy related to the flow.

3. The method of claim 2, further comprising installing the away table entry, on a network device associated with the destination, to drop the packet associated with the destination and the source associated with the flow.

4. The method of claim 3, further comprising dropping the packet according to the away table entry when it reaches the network device.

5. The method of claim 4, further comprising sending by the network device, in response to dropping the packet, the dropped packet message.

6. The method of claim 1, wherein the dropped packet message comprises a Solicit Map Request (SMR).

7. The method of claim 1, wherein the source is associated with Internet-of-Things (IoT) device.

8. The method of claim 1, wherein the destination is associated with a first server.

9. The method of claim 1, wherein the updated destination is associated with a second server.

10. A method comprising:
receiving, by a computing device over a first session, a refresh message associated with a flow having a destination and a source, wherein receiving the refresh message associated with the flow having the destination and the source comprises receiving a dropped packet message in response to installation of an away table entry in a border device associated with the destination to drop packets specific to a destination and source prefix pair, and wherein the away table entry is installed upon change of a policy related to the destination and source prefix pair denying the source access to the destination;
determining an updated destination for the flow; and
sending, to an Edge Device (ED) associated with the source of the flow over a second session, a map response message indicating an updated destination for the flow.

11. The method of claim 10, further comprising refreshing a map cache for the source of the flow based on the updated destination from the received map response message.

12. The method of claim 10, wherein receiving the refresh message comprises receiving the refresh message in response to a network device sending a predetermined number of dropped packet messages associated with flows having the destination and the source.

13. The method of claim 12, wherein the predetermined number of dropped packet messages comprise a predetermined number of Solicit Map Requests (SMRs).

14. The method of claim 10, wherein the computing device comprises a map server.

15. The method of claim 10, wherein the first session comprises a first secured Transmission Control Protocol (TCP) session.

16. The method of claim 10, wherein the second session comprises a second secured Transmission Control Protocol (TCP) session.

17. A non-transitory computer-readable medium that stores a set of instructions which when executed perform a method executed by the set of instructions comprising:
receiving, by a computing device, a dropped packet message when a packet associated with a flow having a destination and a source was dropped before it reached the destination, wherein receiving the dropped packet message when the packet associated with the flow having the destination and the source was dropped before it reached the destination comprises receiving the dropped packet message in response to installation of an away table entry in a border device associated with the destination to drop packets specific to a destination and source prefix pair, and wherein the away table entry is installed upon change of a policy related to the destination and source prefix pair denying the source access to the destination;
sending, in response to receiving the dropped packet message, a map request message to a Map Server (MS);
receiving, in response to sending the map request message, a map response message indicating an updated destination for the flow; and
refreshing a map cache for the source of the flow based on the updated destination from the received map response message.

18. The non-transitory computer-readable medium of claim 17, wherein the dropped packet message comprises a Solicit Map Request (SMR).

19. The non-transitory computer-readable medium of claim 17, wherein the source is associated with Internet-of-Things (IoT) device.

20. The non-transitory computer-readable medium of claim 17, wherein the destination is associated with a first server and wherein the updated destination is associated with a second server.

* * * * *